United States Patent Office 3,000,844
Patented Sept. 19, 1961

3,000,844
FILM-FORMING COMPOSITION COMPRISING PARTICULATE POLYVINYL FLUORIDE DISPERSED IN A LACTONE
Manville Isager Bro, Wilmington, Del., assignor to E. I. du Pont de Nemours and Company, Wilmington, Del., a corporation of Delaware
No Drawing. Filed May 21, 1959, Ser. No. 814,679
10 Claims. (Cl. 260—30.4)

This invention relates to compositions of matter, and more particularly to novel film-forming compositions suitable for the manufacture of polyvinyl fluoride films. This application is a continuation-in-part of my copending application Serial No. 679,770, filed August 22, 1957.

The preparation of orientable polyvinyl fluoride is described in U.S. Patents 2,419,008, 2,419,010, 2,510,783 and 2,559,300. Although films of polyvinyl fluoride have been described, no entirely satisfactory film-forming technique has heretofore been devised. With polyvinyl fluoride high enough in molecular weight that films produced therefrom have useful property levels, melt viscosities, even at temperatures well above the crystalline melting temperature of the particular polymer, are too high to permit the production of film therefrom by conventional melt extrusion techniques. Attempts to increase the fluidity of the melt by raising its temperature lead to thermal decomposition of the polymer which occurs at temperatures above approximately 220° C., evidenced chiefly by a brownish discoloration of the film. As a matter of fact, even with radically modified, massive, heavy-duty equipment it has not been possible to melt extrude films of these higher molecular weight polyvinyl fluorides by conventional melt extrusion techniques.

The casting of the films by flowing solutions of the polymer onto suitable surfaces and subsequently volatilizing the solvent would seem to offer a means of avoiding the problems of thermal instability and high melt viscosity associated with melt extrusion. Unfortunately, however, polyvinyl fluoride is insoluble in commonly used volatile solvents such as acetone, petroleum ether, isooctane, xylene, carbon tetrachloride, chloroform, methanol, ethanol, etc., and polyvinyl fluorides of high inherent viscosity (high molecular weight), which are preferred for film manufacture, are only very slightly soluble even in hot solvents such as hot dimethyl formamide, tetramethylene sulfone, nitroparaffins, cyclohexanone, dibutyl ketone, mesityl oxide, aniline, phenol, methylbenzoate, phenyl acetate and diethyl phosphate. While the use of hot solutions to accomplish solvent casting techniques has met with some success, it does present serious problems from the standpoint of equipment and safety requirements.

Further, all orientable polyvinyl fluorides do not enjoy even the same degree of limited solubility indicated above. For example, those orientable polyvinyl fluorides produced according to procedures described in U.S. Patents 2,510,783 and 2,599,300, even in the relatively low molecular weight ranges, are not completely soluble even in hot solvents. As polymer molecular weight increases into the more useful range, this degree of intractability increases markedly to the point where undissolved polymer gel may exist even at the boiling point of the solvent. The presence of gel structures precludes the manufacture of homogeneous polyvinyl fluoride film by solution casting of the higher molecular weight polymer.

Furthermore, film formation by solution casting techniques is normally characterized by relatively low throughput efficiency; for example, film yields from a pound of solution commonly range between 0.1 and 0.25 pound. For economy of manufacture, rather extensive solvent recovery and recycling facilities must normally be provided, in addition to rather extensive precautions relating to the toxicity and fire hazards inherent in such operations.

The pirmary object of this invention, therefore, is to provide a film-forming composition containing as the film-former polyvinyl fluoride of relatively high inherent viscosity, which composition may be readily converted by extrusion techniques into a self-sustaining film at an economically satisfactory throughput efficiency under such conditions that the polymer is not subjected to thermal degradation. Other objects will appear from the description which follows.

These objects are realized by the present invention which, briefly stated, comprises a fluid composition comprising essentially an admixture of particulate polyvinyl fluoride and at least one organic compound selected from the class represented by the structural formula

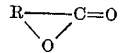

where R is a divalent hydrocarbon radical of from 2 to 7 carbon atoms, 2 to 5 carbon atoms of R being in the ring, said composition containing from 5% to 85% by weight of polyvinyl fluoride, based on the total weight of polyvinyl fluoride and said organic compound, and capable of being cast to form a self-supporting film of polyvinyl fluoride.

The polyvinyl fluoride preferred for the film-forming compositions of this invention is of the orientable type, preferably having an inherent viscosity of at least 0.35, and is employed in said film-forming compositions in the form of discrete particles, said particles preferably having a minimum average diameter of not less than about 0.005–0.010 micron.

As representative compounds of the aforementioned class of organic compounds of the formula

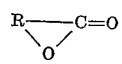

useful for purposes of this invention, there may be mentioned: beta-propiolactone, beta-methyl-beta-propiolactone, beta,beta-dimethyl-beta-propiolactone, beta,beta-methylethyl - beta - propiolactone, alpha - angelicalactone, gamma-butyrolactone, beta-angelicalactone, crotolactone, gamma-valerolactone, alpha - methyl - gamma-butyrolactone, beta-methyl-gamma-butyrolactone, alpha,alpha-dimethyl-gamma-butyrolactone, alpha,beta-dimethyl-gamma-butyrolactone, beta,beta-dimethyl-gamma-butyrolactone, beta,gamma-dimethyl-gamma-butyrolactone, alpha,gamma-dimethyl-gamma-butyrolactone, gamma,gamma-dimethyl-gamma-butyrolactone, alpha-ethyl-gamma-butyrolactone, beta-ethyl-gamma-butyrolactone, gamma-n-caprolactone, alpha,alpha,gamma-trimethyl-gamma-butyrolactone, alpha,gamma,gamma-trimethyl-gamma-butyrolactone, alpha-isopropyl-gamma-butyrolactone, beta-isopropyl-gamma-butyrolactone, gamma-isopropyl-gamma-butyrolactone, gamma-n-heptolactone, delta-valerolactone, alpha-methyl-delta-valerolactone, beta-methyl-delta-valerolactone, gamma - methyl-delta-valerolactone, delta-n-caprolactone, alpha,alpha - dimethyl-delta-valerolactone, beta,beta-dimethyl-delta-valerolactone, delta,delta-dimethyl-delta-valerolactone, alpha-ethyl-gamma-methyl-gamma-butyrolactone, gamma - methyl - gamma-ethyl-gamma-butyrolactone, alpha-n-propyl-gamma-butyrolactone, gamma,gamma-diethyl-gamma-butyrolactone, beta, gamma-dimethyl-alpha-ethyl-gamma-butyrolactone, gamma-methyl-alpha-isopropyl-gamma-butyrolactone, alpha-methyl-gamma-isopropyl-gamma-butyrolactone, gamma-methyl-alpha-n-propyl-gamma-butyrolactone and delta-methyl-gamma-ethyl-delta-valerolactone. These compounds are further characterized in that they have substantially no solvent action on polyvinyl fluoride at room temperature but are capable of coalescing particles of polyvinyl fluoride at elevated temperatures, i.e., they are latent solvents for the polymer.

Preferred compositions of this invention comprise essentially admixtures of particulate polyvinyl fluoride and at least one organic compound selected from the class represented by the structural formula

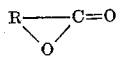

where R is a divalent hydrocarbon radical of from 3 to 7 carbon atoms, 3 to 4 carbon atoms of R being in the ring. This preferred classification embraces the more stable lactones, i.e., those with 5 or 6 atoms in the ring.

Although the polyvinyl fluoride content of the film-forming composition may vary within the range of from 5% to 85% by weight, the optimum ranges will vary according to the film casting technique to be employed. Thus, where the mixture consisting of particulate polyvinyl fluoride uniformly mixed with the organic compound is to be extruded into a coalescing hot oil bath, the polyvinyl fluoride content may range from 25% to 40% by weight, preferably from 30% to 35%. Where the mixture is to be extruded onto a plate or belt at room temperature, followed by heating in air to coalesce, the polyvinyl fluoride content may range from 10% to 60% by weight, preferably from 30% to 40%. And, where the mixture is to be extruded as a hot coalesced mass into a cold quench bath, the polyvinyl fluoride content may range from 20% to 85% by weight, and preferably from 40% to 60% of the composition. These mixtures, depending in part on the proportions used within the specified limits and upon the particular organic compound employed, may range in consistency from fluffy, damp, free-flowing powders through heavy pastes and viscous fluids to freely-flowing fluids. The mixtures constituting the film-forming compositions of this invention are, in all of the above-described consistencies, two-phase systems consisting of solid, particulate polyvinyl fluoride (the dispersed, internal or discontinuous phase) and the aforementioned organic compound (the dispersion medium; the external or continuous phase), and are thereby readily distinguishable from true polymer solutions which constitute homogeneous single-phase systems. These film-forming compositions may be prepared by mixing or blending the solid polymer and the aforementioned organic compound by any convenient expedient. Mixing time will vary and will depend in part on the nature of the equipment chosen, the size of the charge in relation to the capacity of the mixer and the percent of the organic compound in the charge.

In addition to the homopolymer, this invention embraces compositions of matter comprising mixtures of at least one of the aforementioned organic compounds with copolymers of vinyl fluoride with other mono-ethylenically unsaturated monomers copolymerizable therewith, wherein the vinyl fluoride is present in substantial or in major amount; i.e., at least 75% to 80% of the total by weight. Examples are mono-ethylenic hydrocarbons, e.g., ethylene, propylene, isobutylene and styrene; halogen-substituted ethylenes, e.g., vinyl chloride, vinyl bromide, 1,1-dichloroethylene, 1,1-difluoroethylene, difluorochloroethylene, trifluorochloroethylene, tetrafluoroethylene, trifluoropropylene and difluoroisobutylene; vinyl esters, e.g., vinyl formate, vinyl acetate, vinyl propionate, vinyl butyrate, vinyl pivalate, vinyl benzoate, vinyl stearate and vinyl esters of inorganic acids; vinyl ethers, e.g., vinyl ethyl ether, tetrafluoroethylallyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, amides, anhydrides and acid halides, including methyl methacrylate, beta-hydroxyethyl methacrylate, allyl methacrylate, N-butyl methacrylamide, etc.; derivatives of maleic and fumaric acids, e.g., diethyl maleate and dimethyl fumarate; propenyl esters, e.g., allyl acetate and isopropenyl acetate.

The following specific examples of preferred embodiments further illustrate the principles and practice of this invention. Parts and percentages are by weight unless otherwise indicated.

In the following examples, polyvinyl fluorides of varying inherent viscosities are employed. Inherent viscosity is measured by dissolving polyvinyl fluoride in hexamethyl-phosphoramide by violently agitating the mixture at an elevated temperature. The solution is cooled to 30° C., and the viscosity of this solution is measured relative to that of the solvent treated in the same manner. The time of efflux through a viscosimeter is measured for the solvent (no polymer present) and the solution of polymer in solvent. Inherent viscosity is calculated as follows:

Let $T_0$=solvent flow time in seconds
$T_1$=solution flow time in seconds $$\text{Relative viscosity} = \frac{T_1}{T_0}$$

Inherent viscosity=

$$\frac{\text{the natural logarithm of relative viscosity}}{C}$$

where C is the concentration expressed in grams of polymer per 100 milliliters of solution.

To minimize the effect of interaction between polymer molecules on the solution viscosity and to keep the solution viscosity of the same order of magnitude as the solvent viscosity, these determinations were made on solutions having very low polymer concentrations. For example, if the relative viscosity for a given sample of polymer exceeded the range of about 1.1 to 1.8 when a concentration, C, of 0.10 gram of polymer per 100 milliliters of solution was employed, a new determination was made with C reduced to 0.05 gram of polymer per 100 milliliters of solution. Where the relative viscosity determined at C=0.10 g./100 ml. of solution was within the 1.1 to 1.8 range, a check run performed at C=0.05 g./100 ml. of solution usually yielded an inherent viscosity which did not vary more than about 5% from that calculated from the run made at the higher polymer concentration.

The above-described techniques and calculations for arriving at inherent viscosity are those commonly employed and accepted as practical in the polymer field, the sole unique feature in the above being the use of hexamethylphosphoramide as the solvent.

EXAMPLE 1

500 parts of gamma-butyrolactone were introduced into a Waring Blendor. The blendor was operated at a speed of from 500 to 1,000 r.p.m. while 333 parts of particulate polyvinyl fluoride were added to the gamma-butyrolactone, and then continued to operate at this speed for about 30 minutes. Precautions were taken to prevent any appreciable temperature rise during mixing. The polymer had an inherent viscosity of 2.6. After a short burst at a speed of approximately 8,000 r.p.m., the resulting dispersion, 40% polyvinyl fluoride, by weight, was poured into a shallow dish in order to expose as large a surface per unit of volume as practical.

In order to remove all entrapped air bubbles, the dispersion was then subjected to high vacuum overnight. The deaerated dispersion was transferred to a feed reservoir which was connected to a slotted, oil-cooled casting hopper whose lips were immersed to a depth of approximately 1/16 inch to 1/8 inch in a heated bath of white mineral oil.

By means of air pressure at 3–5 p.s.i. gauge, and with the opening of the hopper lips set at approximately 10 mils, the dispersion was extruded into the oil bath which was maintained at approximately 163° C. As the dispersion left the lips of the casting hopper, it coalesced immediately to form a self-supporting film which, after traveling about 1 to 2 inches through the hot oil bath, was conducted into a bath of cooler white mineral oil, maintained at about 30° C. On removal from the cooling bath, both mineral oil and gamma-butyrolactone were extracted by washing the film in acetone. The film was then clamped in a frame and allowed to dry naturally.

EXAMPLE 2

A 40% solids polyvinyl fluoride/gamma-butyrolactone dispersion prepared as in Example 1 was allowed to deaerate under high vacuum for about 45 minutes. The polymer had an inherent viscosity of 2.6. After transfer to the feed reservoir, it was extruded under 10 p.s.i. gauge air pressure into the oil bath which, in this instance, was maintained at 189° C. Again, as in Example 1, a self-supporting film formed immediately, and was conducted from the coalescing bath into the cooling bath, maintained at about 30° C.

On removal from the cooling bath, oil was removed by wiping, the film then clamped in a frame and exposed for 15 minutes to a current of heated air to volatilize the gamma-butyrolactone.

EXAMPLE 3

350 grams of particulate polyvinyl fluoride were coarsely mixed with 650 grams of gamma-butyrolactone, and then this 35% solids mixture charged into a water jacketed stainless steel cylinder, fitted with a screened orifice (200–300 mesh) near the base. A rotatable ½ inch diameter shaft on which were mounted three ¼ inch thick discs was centrally located within the cylinder. The shaft was connected to a ⅓ H.P. electric motor. Approximately one kilogram of carefully washed and dried "Ottawa sand" of 20–30 mesh occupied about one-third of the free space in the cylinder. The polymer had an inherent viscosity of 2.2.

The shaft was rotated at 1800 r.p.m. for about 10 minutes. During this time, an intimate mixture of sand and dispersion was formed by the rotating discs and flowed downward toward the orifice, where the sand was restrained by the fine screen while a smooth agglomerate-free dispersion of polyvinyl fluoride in gamma-butyrolactone was delivered into a receiver at a temperature of approximately 25° C. Cooling water was circulated through the cylinder jacket to prevent any appreciable rise in temperature during mixing. The dispersion was then deaerated by confining it under a high vacuum for two hours.

After deaeration, this smooth dispersion was transferred from the receiver and continuously cast at approximately room temperature through a flexible hose into a pool on the surface of a highly polished, endless stainless steel belt moving at approximately 2 feet per minute. The belt then carried the dispersion first under a vertically adjustable, beveled doctor knife and then into a zone blanketed by nitrogen having a relatively low linear velocity where it was heated rapidly to a temperature of 125° C. About 40 seconds exposure at this temperature was sufficient to cause the dispersed polyvinyl fluoride particles to coalesce into a continuous clear film. The belt then carried the film into a zone of rapidly circulating heated air. Approximately 2 minutes in this zone was sufficient to volatilize substantially all of the gamma-butyrolactone. The resulting film, approximately 3 mils thick, was then cooled rapidly with a water spray and stripped from the moving belt.

EXAMPLE 4

A 60% solids dispersion of polyvinyl fluoride and gamma-butyrolactone was prepared as in Example 1. The polymer had an inherent viscosity of 2.2. After deaeration the resulting smooth dispersion was spread on a flat polished steel plate and placed in an oven at 150° C. for 35 seconds. Under these conditions, the polyvinyl fluoride particles coalesced to form a translucent gel film. After coalescence, the film, containing most of the original gamma-butyrolactone was quenched by immersing the steel plate in cold water. The film was then stripped from the plate, clamped in a frame to prevent shrinkage and placed in a forced air circulation oven to volatilize the gamma-butyrolactone. On removal from the oven, the film was again quenched in cold water and removed from the frame. The resulting film was 5 mils thick.

EXAMPLE 5

Eight pounds of particulate polyvinyl fluoride were blended with 2 pounds of gamma-butyrolactone by mixing for 15 minutes in a Model A–200 Hobart Mixer at a planetary speed of 86 r.p.m. and a beater speed of 198 r.p.m. The inherent viscosity of the polymer was 2.5. The resulting 80% solids dispersion had a damp powder-like consistency. The dispersion was fed to a heated extruder and from there to a slotted steel casting hopper maintained at 190° C. from which it was extruded continuously into a water bath maintained at 10° C., producing a tough, flat sheet about 5 mils thick. While restrained to prevent shrinkage, the sheet of polyvinyl fluoride was led through a zone of rapidly moving heated air, to volatilize substantially all of the gamma-butyrolactone.

EXAMPLE 6

Using a polyvinyl fluoride with an inherent viscosity of 3.7, a 48% solids dispersion in gamma-butyrolactone was formed following the procedure used in Example 5. The resulting dispersion was considerably more fluid than that of Example 5. It was extruded in the same manner at 155° C., and quenched in a water bath maintained at 10° C. After being exposed in a current of heated air for about 10 minutes, a substantially solvent-free film 12 mils thick resulted.

EXAMPLE 7

Three pounds of particulate polyvinyl fluoride were blended with 7 pounds of gamma-butyrolactone by mixing in a Model A–200 Hobart Mixer for 15 minutes as in Example 5. The inherent viscosity of the polymer was 4.5. The resulting 30% solids dispersion had a heavy, paste-like consistency. The dispersion was fed to a heated extruder and from there to a slotted steel casting hopper maintained at approximately 190° C. from which it was extruded continuously into a water bath maintained at approximately 8° C., producing a tough, flat sheet about 20 mils thick.

EXAMPLE 8

1,000 parts of particulate polyvinyl fluoride were blended with 300 parts of gamma-valerolactone by mixing in a conventional ball mill for from 16 to 20 hours. The inherent viscosity of the polymer was 1.6. The resulting 77% solids dispersion was fed to a heated extruder and from there to a slotted steel casting hopper maintained at 175° C. to 180° C., from which it was continuously extruded into a water bath maintained at about 10° C., producing a tough, pliable sheet about 22 mils thick. While restrained to prevent shrinkage, this sheet of polyvinyl fluoride was led through a zone of rapidly moving heated air to volatilize substantially all of the gamma-valerolactone.

EXAMPLE 9

160 parts of particulate polyvinyl fluoride were dispersed in 240 parts of gamma-valerolactone by mixing for approximately 15 minutes in a Model A–200 Hobart Mixer at a planetary speed of 86 r.p.m. and a beater speed of 198 r.p.m. The inherent viscosity of the polymer was 4.9. The resulting 40% solids dispersion was fed to a heated extruder and from there to a slotted steel casting hopper maintained at 150° C. from which it was continuously extruded into a water bath maintained at approximately 8° C., producing a pliable flat sheet about 18 mils thick.

EXAMPLE 10

Using a polyvinyl fluoride with an inherent viscosity of 4.9, a 30% solids dispersion in gamma-valerolactone was formed following the procedure used in Example 9. It was extruded in the same manner as the dispersion in Example 9 at a hopper temperature of 125° C., and quenched in a water bath maintained at about 8° C. A substantially solvent-free film approximately 7 mils thick was produced after exposing the quenched film, clamped in a frame, to a current of heated air for about 10 minutes.

EXAMPLE 11

400 grams of particulate polyvinyl fluoride were coarsely mixed with 600 grams of gamma-valerolactone, and then this 40% solids mixture charged into a water jacketed stainless steel cylinder, fitted with a screened orifice (200–300 mesh) near the base. A rotatable ½" diameter shaft on which were mounted three ¼" thick dics was centrally located within the cylinder. The shaft was connected to a ⅓ H.P. electric motor. Approximately one kilogram of carefully washed and dried "Ottawa sand" of 20–30 mesh occupied about ⅓ of the free space in the cylinder. The polymer had an inherent viscosity of 2.3.

The shaft was rotated at 1800 r.p.m. for about 10 minutes. During this time, an intimate mixture of sand and dispersion was formed by the rotating dics and flowed downward toward the orifice, where the sand was restrained by the fine screen while a smooth agglomerate-free dispersion of polyvinyl fluoride in gamma-valerolactone was delivered into a receiver at a temperature of approximately 25° C. Cooling water was circulated through the cylinder jacket to prevent any appreciable rise in temperature during mixing. The dispersion was then deaerated by confining it under a high vacuum for about 4 hours.

After deaeration, this smooth dispersion was transferred from the receiver and continuously cast at approximately room temperature through a flexible hose into a pool on the surface of a highly polished, endless stainless steel belt moving at approximately two feet per minute. The belt then carried the dispersion first under a vertically adjustable, beveled doctor knife and then into a zone blanketed by nitrogen having a relatively low linear velocity where it was heated rapidly to a temperature of approximately 135° C. Slightly less than one minute exposure at this temperature was sufficient to cause the dispersed polyvinyl fluoride particles to coalesce into a continuous clear film. The belt then carried the film into a zone of rapidly circulating heated air to volatilize substantially all of the gamma-valerolactone. The resulting film, approximately 5 mils thick, was then cooled rapidly with a water spray and stripped from the moving belt.

EXAMPLE 12

180 grams of particulate polyvinyl fluoride were blended with 220 grams of beta-propiolactone in a conventional ball mill for 4 hours. The inherent viscosity of the polymer was approximately 2.5. After deaeration, the resulting smooth dispersion was spread on a flat polished aluminum plate to a depth of approximately 15 mils. The plate was then immersed in a bath of silicone oil maintained at approximately 125° C. After 5 minutes in the bath, the plate was removed and the dispersion was found to be a well-coalesced film. This film was immediately quenched by immersing the plate in cold water. After stripping from the plate, the film was found to be pliable and quite tough.

EXAMPLE 13

A 30% solids dispersion of particulate polyvinyl fluoride in alpha-angelicalactone was prepared by employing the sand milling technique demonstrated in Example 3. The polymer had an inherent viscosity of approximately 3.3. After deaeration, this smooth dispersion was spread on a polished ferrotype plate, and the polymer particles coalesced to produce a tough gel film by briefly exposing said plate under a bank of infrared lamps. The film was then clamped to the plate to prevent shrinkage and exposed in a current of circulating air maintained at approximately 140° C. for about 5 minutes to volatilize the lactone. Following this procedure, the film was quenched by immersing the plate in cold water. After stripping from the plate, the resulting film was found to be clear and tough.

EXAMPLE 14

A 30% solids dispersion of particulate polyvinyl fluoride in epsilon-caprolacetone was prepared by employing the sand milling technique demonstrated in Example 3. The polymer had an inherent viscosity of approximately 3.3. After deaeration, this smooth dispersion was spread on a polished ferrotype plate, and the polymer particles coalesced to produce a tough gel film by briefly exposing said plate under a blank of infrared lamps. The film was then clamped to the plate to prevent shrinkage and exposed in a current of circulating air maintained at approximately 180° C. for about 5 minutes to volatilize the lactone. Following this procedure, the film was quenched by immersing the plate in cold water. After stripping from the plate, the resulting film was found to be clear and tough.

EXAMPLE 15

A 40% solids dispersion of particulate polyvinyl fluoride in crotolactone was prepared as in Example 1. The polymer had an inherent viscosity of 2.5. After deaeration a resulting smooth dispersion was spread on a flat, polished ferrotype plate and placed in an oven maintained at approximately 170° C. Less than 30 seconds exposure to these conditions was sufficient to cause the polyvinyl fluoride particles to coalesce, forming a translucent gel film. After coalescence, the film, containing most of the original crotolactone, was quenched by immersing the ferrotype plate in cold water. After stripping from the plate, the film was found to be quite tough and pliable. After clamping the film in a frame to prevent shrinkage, the crotolactone was volatilized by exposing the film in a current of heated air.

EXAMPLE 16

Following the procedure of Example 15 and employing the same polymer, 40% solids dispersions of this polymer were made in the following lactones. Table I, below, indicates the oven temperature at which coalescence took place, the exposure time necessary to effect coalescence and the thickness of the quenched film. In each instance, the quenched film was extremely tough and quite pliable. In the case of alpha,gamma,gamma-trimethyl-gamma-butyrolactone, the lactone was heated to approximately 65° C. so that it could be introduced into the Waring Blendor in the liquid state. Thereafter, no precautions were taken to prevent temperature rise due to the mechanical action of mixing, and the lactone remained liquified during the mixing operation.

*Table I*

| Compound | Oven Temp., °C. | Exposure Time to Coalesce, secs. | Thickness of Quenched Film, mils |
|---|---|---|---|
| alpha,gamma-gamma-trimethyl-gamma-butyrolactone | 195 | 55 | 22 |
| gamma-isopropyl-gamma-butyrolactone | 205 | 50 | 18 |
| gamma-methyl-alpha-isopropyl-gamma-butyrolactone | 205 | 45 | 18 |
| delta-valerolactone | 175 | 35 | 22 |
| delta-n-caprolactone | 200 | 40 | 20 |

EXAMPLE 17

Employing the polymer of Example 6, 45% solids dispersions of particulate polyvinyl fluoride were prepared by blending in a Model A-200 Hobart Mixer (as described in Example 5), using each of the lactones listed in Table II below. The resulting dispersions were fed to a heated extruder and from there to a slotted steel casting hopper maintained at various temperatures (as indicated in Table II), from which they were extruded continuously into a water bath maintained at approximately 10° C. Tough, pliable flat sheets were produced in each instance.

*Table II*

| Compound | Extrusion Temp., °C. | Thickness of Quenched Film, mils |
|---|---|---|
| gamma,gamma-dimethyl-gamma-butyrolactone | 185 | 23 |
| gamma-n-caprolactone | 185 | 18 |
| delta,delta-dimethyl-delta-valerolactone | 210 | 12 |

EXAMPLE 18

Employing particulate polyvinyl fluoride having an inherent viscosity of 4.9, a 10% solids dispersion of polyvinyl fluoride in gamma-butyrolactone was prepared following the procedure of Example 1. After deaeration, this smooth, rather fluid dispersion was spread on a flat, polished ferrotype plate and placed in an oven maintained at approximately 155° C. After about 45 seconds exposure to these conditions, the polyvinyl fluoride particles coalesced to form a translucent gel film. After coalescence, the film, containing most of the original gamma-butyrolactone, was quenched by immersing the plate in cold water. The film was then stripped from the plate, clamped in a frame to prevent shrinkage and placed in a current of heated air to volatilize the gamma-butyrolactone. The solvent-free film was again quenched in cold water and removed from the frame. The resulting film, approximately 3 mils thick, was found to be quite tough and pliable.

Employing the same polymer, a 10% solids dispersion in gamma-valerolactone was prepared, deaerated, cast onto a ferrotype plate and coalesced into a gel film in the same manner as described above. The resulting 2½ mil thick film was also found to be quite tough and flexible.

The advantages of this invention are attributable to the great versatility of the organic compounds employed, which lend themselves to mixing and blending in almost unlimited and variable proportions with polyvinyl fluoride. Since compounds of the above-described class are either liquids at room temperature or have relatively low melting points, mixing may be accomplished without the additional complication of maintaining elaborate and extensive heating facilities. The compositions of this invention cover a broad spectrum of solids content and may be formed into such shaped structures as films with a variety of equipment and under a wide variety of conditions as shown in the foregoing examples. The use of these organic compounds permits a very broad approach to the long-standing problem of polyvinyl fluoride film formation. They permit the realization of processes having satisfactory throughput efficiency without extraordinary investment in equipment and without risking degradation to the polymer itself. They further permit the formation of films from polyvinyl fluorides in the higher molecular weight ranges. It is to be understood that although the compositions of this invention are chiefly applicable in the manufacture of film, they are useful as well for the preparation of other shaped structures, e.g., fibers, filaments, rods, tubes, etc.

Compounds in this class having five or six membered rings are quite stable. The use of compounds in this class does not require any extraordinary precautions from either the toxicity or the flammability standpoints.

I claim:

1. A film-forming composition capable of being formed into self-supporting film by coalescence comprising essentially a two phase system consisting of particulate polyvinyl fluoride as a discontinuous phase, and as a continuous phase in which the polyvinyl fluoride particles are uniformly distributed at least one organic compound selected from the class represented by the structural formula

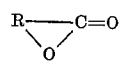

where R is a divalent hydrocarbon radical of from 2 to 7 carbon atoms, 2 to 5 carbon atoms of R being in the ring, the polyvinyl fluoride particles having a minimum average diameter of not less than about 0.005–0.010 micron.

2. A film-forming composition capable of being formed into a self-supporting film by coalescence comprising essentially a two phase system consisting of particulate polyvinyl fluoride as a discontinuous phase, and as a continuous phase in which the polyvinyl fluoride particles are uniformly dispersed an organic compound selected from the class represented by the structural formula

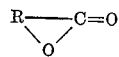

where R is a divalent hydrocarbon radical of from 2 to 7 carbon atoms, 2 to 5 carbon atoms of R being in the ring, the polyvinyl fluoride particles constituting from about 5% to about 85% of the total weight of the dispersion and having a minimum average diameter of not less than about 0.005–0.010 micron.

3. A composition of claim 2 wherein the polyvinyl fluoride has an inherent viscosity of at least 0.35.

4. A film-forming composition capable of being formed into self-supporting film by coalescence comprising essentially a two phase system consisting of particulate polyvinyl fluoride as a discontinuous phase, and as a continuous phase in which the polyvinyl fluoride particles are uniformly distributed at least one organic compound selected from the class represented by the structural formula

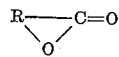

where R is a divalent hydrocarbon radical of from 3 to 7 carbon atoms, 3 to 4 carbon atoms of R being in the ring, the polyvinyl fluoride particles having a minimum average diameter of not less than about 0.005–0.010 micron.

5. A film-forming composition capable of being formed into self-supporting film by coalescence comprising essentially a two phase system consisting of particulate polyvinyl fluoride as a discontinuous phase, and as a continuous phase in which the polyvinyl fluoride particles are uniformly dispersed an organic compound selected from the class represented by the structural formula

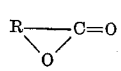

where R is a divalent hydrocarbon radical of from 3 to 7 carbon atoms, 3 to 4 carbon atoms of R being in the ring, the polyvinyl fluoride particles constituting from about 5% to about 85% of the total weight of the dispersion and having a minimum average diameter of not less than about 0.005–0.010 micron.

6. A composition of claim 5 wherein the polyvinyl fluoride has an inherent viscosity of at least 0.35.

7. A film-forming composition capable of being formed into self-supporting film by coalescence comprising essentially a two phase system consisting of particulate polyvinyl fluoride as a discontinuous phase, and as a continuous phase in which the polyvinyl fluoride particles are uniformly dispersed gamma-butyrolactone, the polyvinyl fluoride particles constituting from about 5% to about 85% of the total weight of the dispersion and having a minimum average diameter of not less than about 0.005–0.010 micron.

8. A composition of claim 7 wherein the polyvinyl fluoride has an inherent viscosity of at least 0.35.

9. A film-forming composition capable of being formed into self-supporting film by coalescence comprising essentially a two phase system consisting of particulate polyvinyl fluoride as a discontinuous phase, and as a continuous phase in which the polyvinyl fluoride particles are uniformly dispersed gamma-valerolactone, the polyvinyl fluoride particles constituting from about 5% to about 85% of the total weight of the dispersion and having a minimum average diameter of not less than about 0.005–0.010 micron.

10. The composition of claim 9 wherein the polyvinyl fluoride has an inherent viscosity of at least 0.35.

References Cited in the file of this patent

UNITED STATES PATENTS

| | | |
|---|---|---|
| 2,419,008 | Coffman et al. | Apr. 15, 1947 |
| 2,687,400 | D'Alelio | Aug. 24, 1954 |
| 2,734,888 | D'Alelio | Feb. 14, 1956 |
| 2,866,721 | Hetherington | Dec. 30, 1958 |

UNITED STATES PATENT OFFICE
CERTIFICATE OF CORRECTION

Patent No. 3,000,844                  September 19, 1961

Manville Isager Bro

It is hereby certified that error appears in the above numbered patent requiring correction and that the said Letters Patent should read as corrected below.

Column 1, line 18, for "2,559,300" read -- 2,599,300 --; column 2, line 5, for "pirmary" read -- primary --; column 8, line 17, for "epsilon-caprolacetone" read -- epsilon-caprolactone --; line 23, for "blank" read -- bank --.

Signed and sealed this 1st day of May 1962.

(SEAL)
Attest:

ERNEST W. SWIDER                      DAVID L. LADD
Attesting Officer                      Commissioner of Patents